(12) United States Patent  (10) Patent No.: US 9,047,201 B2
Chen et al.                (45) Date of Patent: Jun. 2, 2015

(54) METHOD FOR WAKING UP A PLURALITY OF HIBERNATED MASS STORAGE DEVICES

(75) Inventors: Hsuan-Ting Chen, Taichung (TW); Kuei-Huan Chen, New Taipei (TW); Ming-Hung Tsai, New Taipei (TW)

(73) Assignee: Synology Incorporated, Taipei (TW)

( * ) Notice: Subject to any disclaimer, the term of this patent is extended or adjusted under 35 U.S.C. 154(b) by 460 days.

(21) Appl. No.: 13/337,149

(22) Filed: Dec. 25, 2011

(65) Prior Publication Data

US 2013/0166933 A1    Jun. 27, 2013

(51) Int. Cl.
  *G06F 1/26* (2006.01)
  *G06F 1/00* (2006.01)
  *G06F 12/08* (2006.01)

(52) U.S. Cl.
  CPC .................................. *G06F 12/0877* (2013.01)

(58) Field of Classification Search
  USPC .......................... 713/300, 310, 320, 322, 323
  See application file for complete search history.

(56) References Cited

U.S. PATENT DOCUMENTS

| | | | |
|---|---|---|---|
| 6,012,124 A * | 1/2000 | Kamo et al. | 711/114 |
| 7,305,572 B1 * | 12/2007 | Burroughs et al. | 713/300 |
| 7,370,220 B1 | 5/2008 | Nguyen | |
| 2009/0043945 A1 * | 2/2009 | Cheng et al. | 711/100 |
| 2009/0077392 A1 * | 3/2009 | Fujimoto | 713/300 |
| 2010/0023685 A1 * | 1/2010 | Ikejiri et al. | 711/114 |
| 2010/0157463 A1 * | 6/2010 | Arizono et al. | 360/73.03 |
| 2011/0185213 A1 * | 7/2011 | Yoshida et al. | 713/340 |
| 2011/0252289 A1 * | 10/2011 | Patapoutian et al. | 714/763 |

FOREIGN PATENT DOCUMENTS

TW    I232647    5/2005

* cited by examiner

*Primary Examiner* — Zahid Choudhury
(74) *Attorney, Agent, or Firm* — Winston Hsu; Scott Margo

(57) ABSTRACT

A method for waking up a plurality of hibernated mass storage devices is disclosed. The method includes receiving a first command from a control circuit for accessing data stored in a plurality of hibernated mass storage devices; dividing the plurality of hibernated mass storage devices into a plurality of mass storage groups; waking up a first mass storage group of the plurality of mass storage groups; and notifying the control circuit to stop sending commands to the remaining hibernated mass storage devices in a period of time.

9 Claims, 6 Drawing Sheets

METHOD FOR WAKING UP A PLURALITY OF HIBERNATED MASS STORAGE DEVICES

BACKGROUND OF THE INVENTION

1. Field of the Invention

The present invention relates to a method for waking up a plurality of hibernated mass storage devices, and more particularly, to a method for waking up a plurality of hibernated mass storage devices group by group.

2. Description of the Prior Art

As related technology keeps improving, mass storage devices possess more space for storing more data. In order to provide larger space at lower cost, a storage system may comprise an array of hard disks, such as Redundant Array of Independent Disks (RAID). Generally, the hard disks of the storage system consume more than 50% of total power of the storage system. In order to decrease power consumption, when the storage system is in an idle state, the hard disks of the storage system are set to a hibernation mode to stop operation of the hard disks. However, when the storage system is trying to wake up the hibernated hard disks to access data stored in the hard disks, the hibernated hard disks need more power to be woken up immediately, so that the power consumption of the storage system increases sharply. The power consumption of the storage system during the wake up process is much larger than the power consumption of the storage system during normal operation.

The storage system of the prior art is not able to wake up the hibernated hard disks with lower power consumption. Besides, a power supply with maximum power much larger than the power consumption of the storage system during normal operation is needed for the storage system. Therefore, the storage system of the prior art is not power efficient.

SUMMARY OF THE INVENTION

The present invention provides a method for waking up a plurality of hibernated mass storage devices. The method comprises receiving a first command from a control circuit for accessing data stored in a plurality of hibernated mass storage devices; dividing the plurality of hibernated mass storage devices into a plurality of mass storage groups; waking up a first mass storage group of the plurality of mass storage groups; and notifying the control circuit to stop sending commands to the remaining hibernated mass storage devices in a period of time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
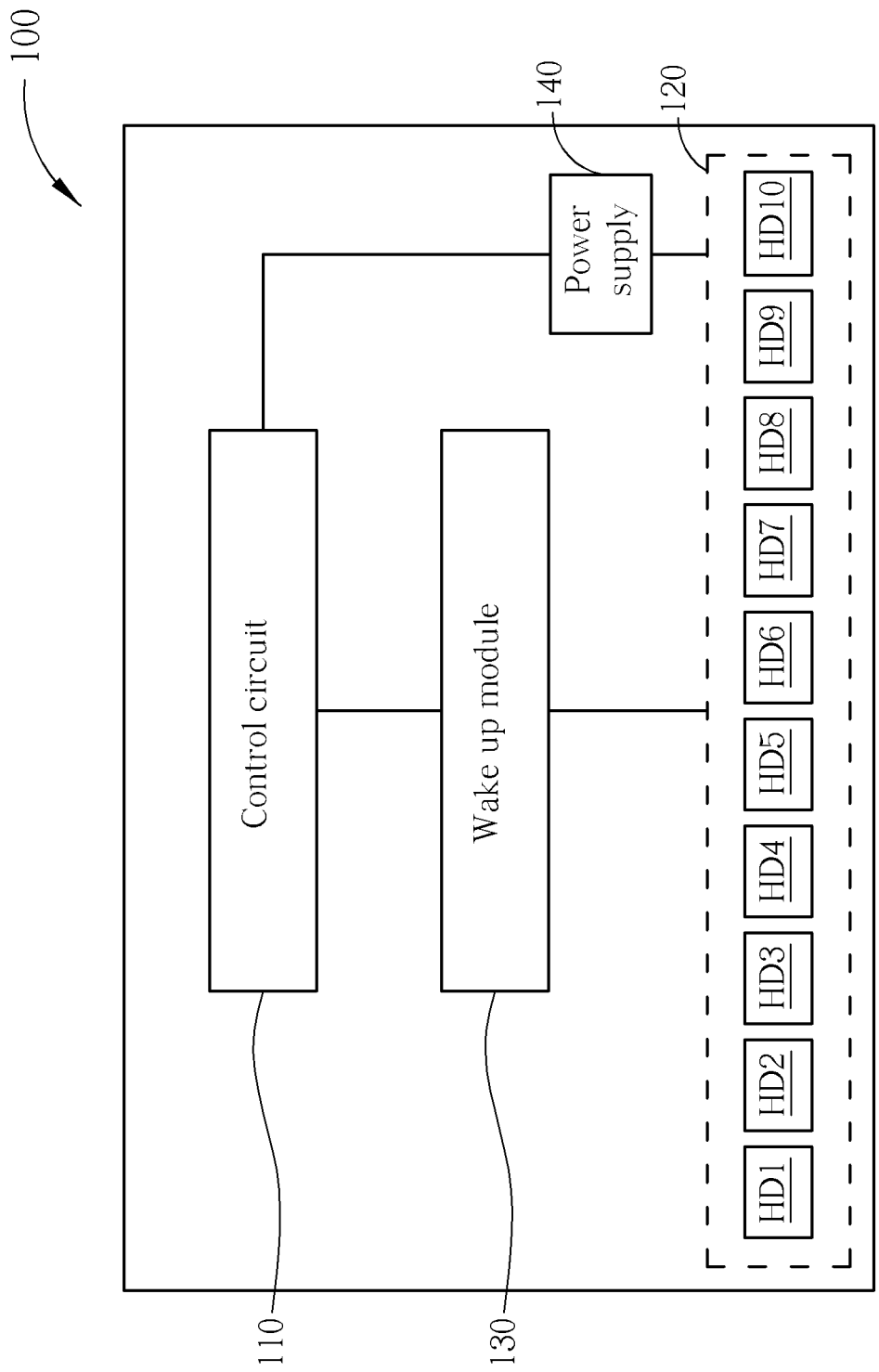
FIG. 1 is a diagram showing a storage system of the present invention.

Please refer to FIG. 1, which is a diagram showing a storage system 100 of the present invention. The storage system 100 of the present invention comprises a control circuit 110, an array of hard disks 120, a wake up module 130, and a power supply 140. The control circuit 110 is for controlling operation of the array of hard disks 120. The power supply 140 is electrically connected to the array of hard disks 120 for providing power to the array of hard disks 120. The wake up module 130 is for controlling a wake up process of the array of hard disks 120 according to power consumption of the hard disks HD1-HD10 and power performance of the power supply 140. The wake up module 130 can be in a form of hardware, firmware, software, or any combination of the above.

Please refer to FIG. 2 to FIG. 5, and refer to FIG. 1 as well. FIG. 2 to FIG. 5 are diagrams showing the storage system 100 waking up the plurality of hibernated hard disks HD1-HD10. When the storage system 100 is in an idle state, the hard disks HD1-HD10 of the storage system 100 are set to a hibernation mode to stop operation of the hard disks HD1-HD10, such that power consumption of the storage system 100 is decreased. In order to wake up the hibernated hard disks HD1-HD10 to access data stored in the hard disks HD1-HD10, the control circuit 110 generates a command to wake up the hibernated hard disks HD1-HD10. After the wake up module 130 receives the command, the wake up module 130 divides the plurality of hibernated hard disks HD1-HD10 into a plurality of mass storage groups according to power consumption of the hard disks HD1-HD10 and power performance of the power supply 140. For example, assuming a maximum power of the power supply 140 is 200 Watts, a transient power limit of the power supply 140 is 100 Watts, the power consumption of each hard disk HD1-HD10 in the hibernation mode is 2 Watts, the power consumption of other remaining components is 10 Watts, a transient power to wake up each hibernated hard disk HD1-HD10 from the hibernation mode is 28 Watts (from 2 Watts to 30 Watts), and the power consumption of each hard disk HD1-HD10 in operation is 15 Watts, then the wake up module 130 divides the plurality of hibernated hard disks HD1-HD10 into four mass storage groups G1-G4, where the first mass storage group G1 comprises three hibernated hard disks HD1-HD3, the second mass storage group G2 comprises three hibernated hard disks HD4-HD6, the third mass storage group G3 comprises two hibernated hard disks HD7 and HD8, and the fourth mass storage group comprises two hibernated hard disks HD9 and HD10.

Figure 2:
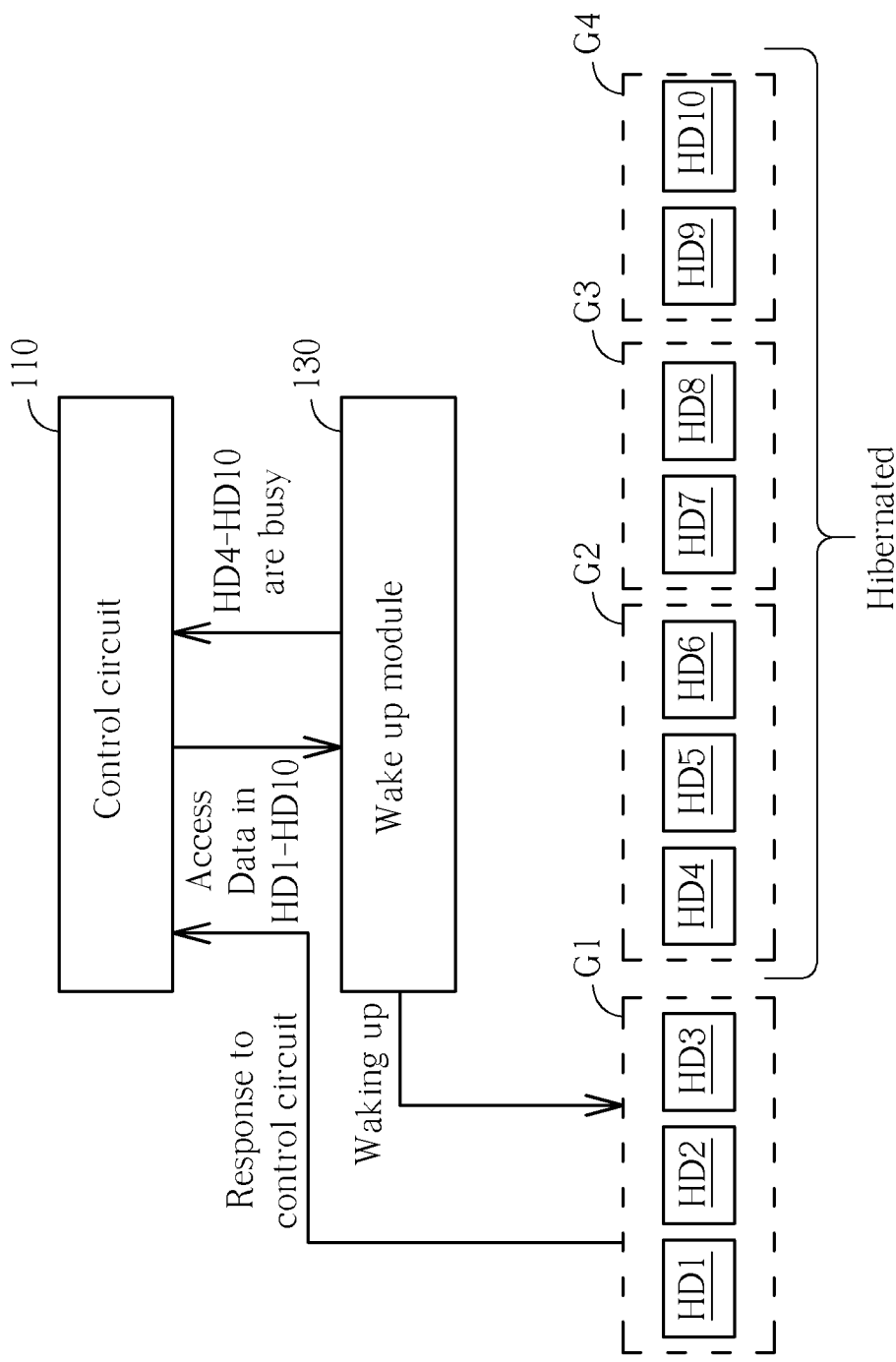
FIG. 2 to FIG. 5 are diagrams showing the storage system waking up the plurality of hibernated hard disks.

As shown in FIG. 2, the wake up module 130 first wakes up the first mass storage group G1, and the second to fourth mass storage groups G2-G4 are still in the hibernation mode. The transient power to wake up the first mass storage group G1 is 84 Watts, which is lower than the transient power limit of the power supply 130. The total power consumption of the storage system 100 is 116 Watts, which is lower than the maximum power of the power supply 140. The woken up hard disks HD1-HD3 in the first mass storage group G1 will then respond to the control circuit 110 for data access, and the hibernated hard disks HD4-HD10 in the mass storage groups G2-G4 will not respond to the control circuit 110. If the control circuit 110 does not receive any response from the hibernated hard disks HD4-HD10, the control circuit 110 may assume the hibernated hard disks HD4-HD10 are in an error state. In order to prevent such a situation, the wake up module 130 generates a notice to notify the control circuit 110 that the remaining hibernated hard disks HD4-HD10 are in a busy state, such that the control circuit 110 will stop sending commands to the remaining hibernated hard disks HD4-HD10 in a period of time. The wake up module 130 also can generate other kinds of notice (such as a reject notice) to the control circuit 110 to request the control circuit 110 to stop sending commands to the remaining hibernated hard disks HD4-HD10 in a period of time. When there are still some hard disks in the hibernation mode, the wake up module 130 will keep generating a notice corresponding to the command transmitted from the control circuit 110 for accessing data stored in the hibernated hard disks, such that the control circuit 110 will stop sending commands to the remaining hibernated hard disks in a period of time. The notice or command transmitted between the control circuit 110 and the wake up module 130 can be a hardware command, a software command, or any other type of command.

Figure 3:
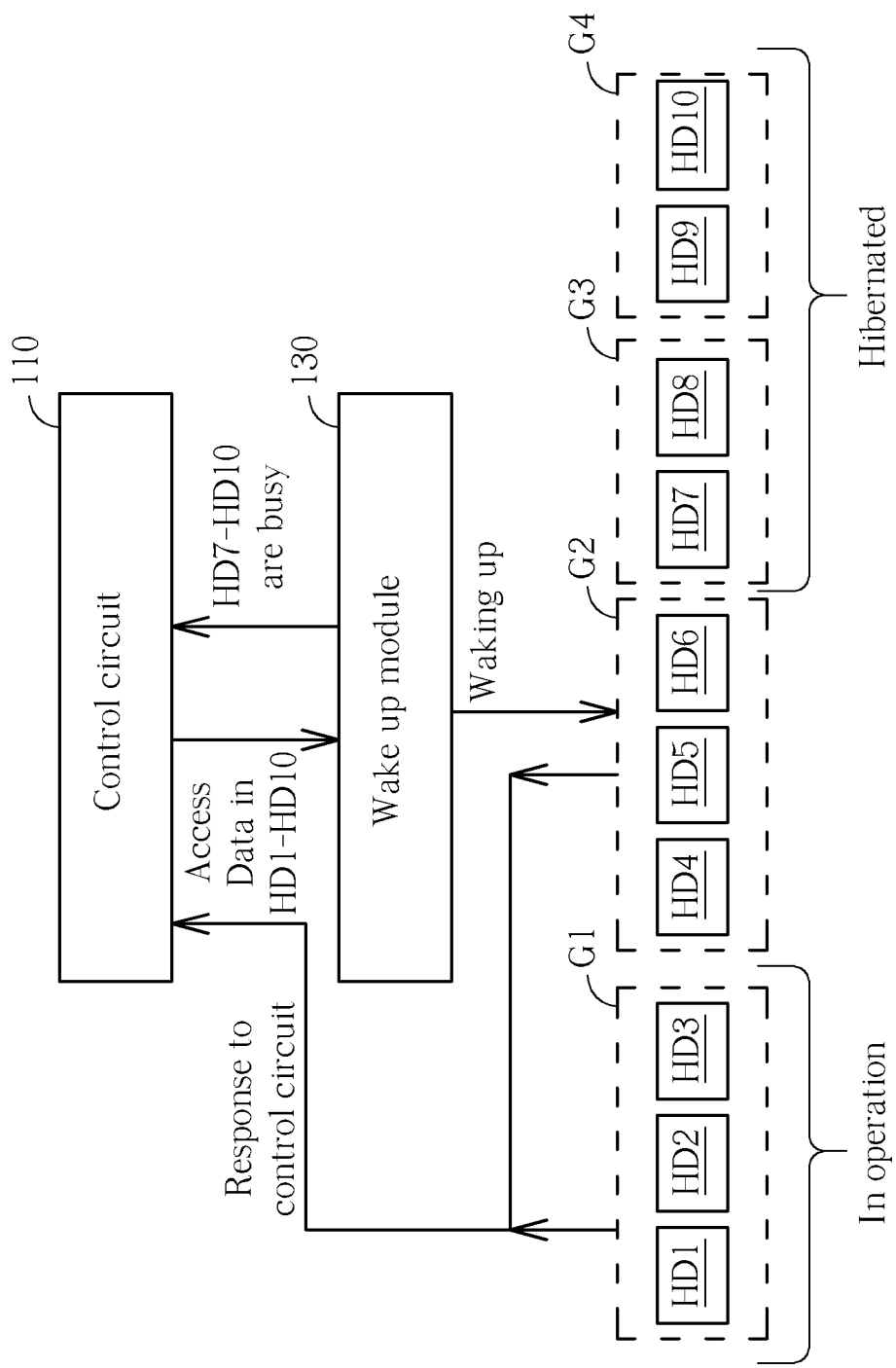

As shown in FIG. 3, after the first mass storage group G1 is woken up, the wake up module 130 then wakes up the second mass storage group G2, and the third and fourth mass storage groups G3, G4 are still in the hibernation mode. The transient power to wake up the second mass storage group G2 is 84 Watts, which is lower than the transient power limit of the power supply 140. The total power consumption of the storage system 100 is 153 Watts, which is lower than the maximum power of the power supply 140. Similarly, the wake up module 130 will generate the notice corresponding to the command transmitted from the control circuit 110 for accessing data stored in the hibernated hard disks HD7-HD10, such that the control circuit 110 will stop sending commands to the remaining hibernated hard disks HD7-HD10 in a period of time.

Figure 4:
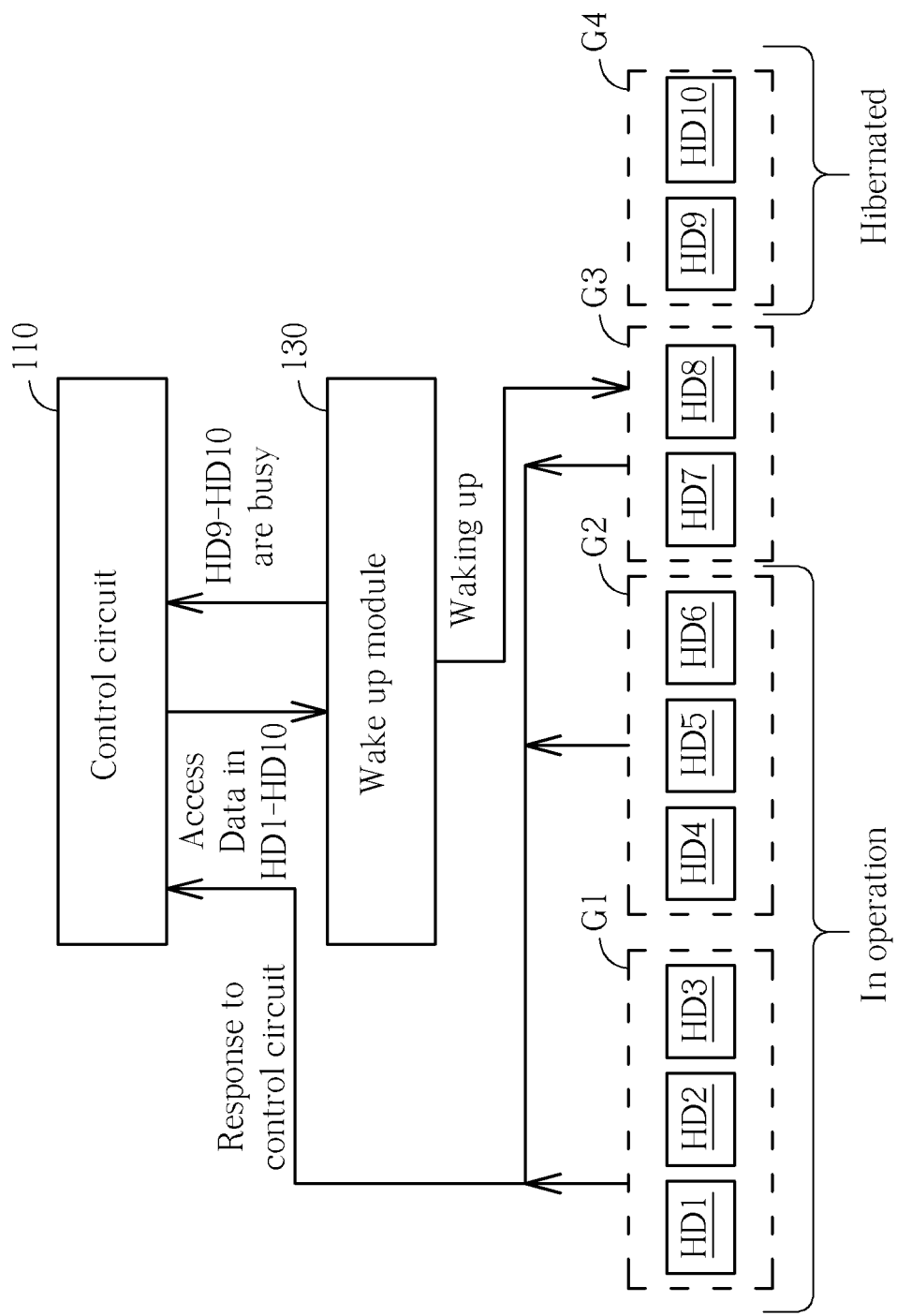

As shown in FIG. 4, after the first and the second mass storage groups G1, G2 are woken up, the wake up module 130 then wakes up the third mass storage group G3, and the fourth mass storage group G4 is still in the hibernation mode. The transient power to wake up the third mass storage group G3 is 56 Watts, which is lower than the transient power limit of the power supply 140. The total power consumption of the storage system 100 is 164 Watts, which is lower than the maximum power of the power supply 140. Similarly, the wake up module 130 will generate the notice corresponding to the command transmitted from the control circuit 110 for accessing data stored in the hibernated hard disks HD9-HD10, such that the control circuit 110 will stop sending commands to the remaining hibernated hard disks HD9-HD10 in a period of time.

Figure 5:
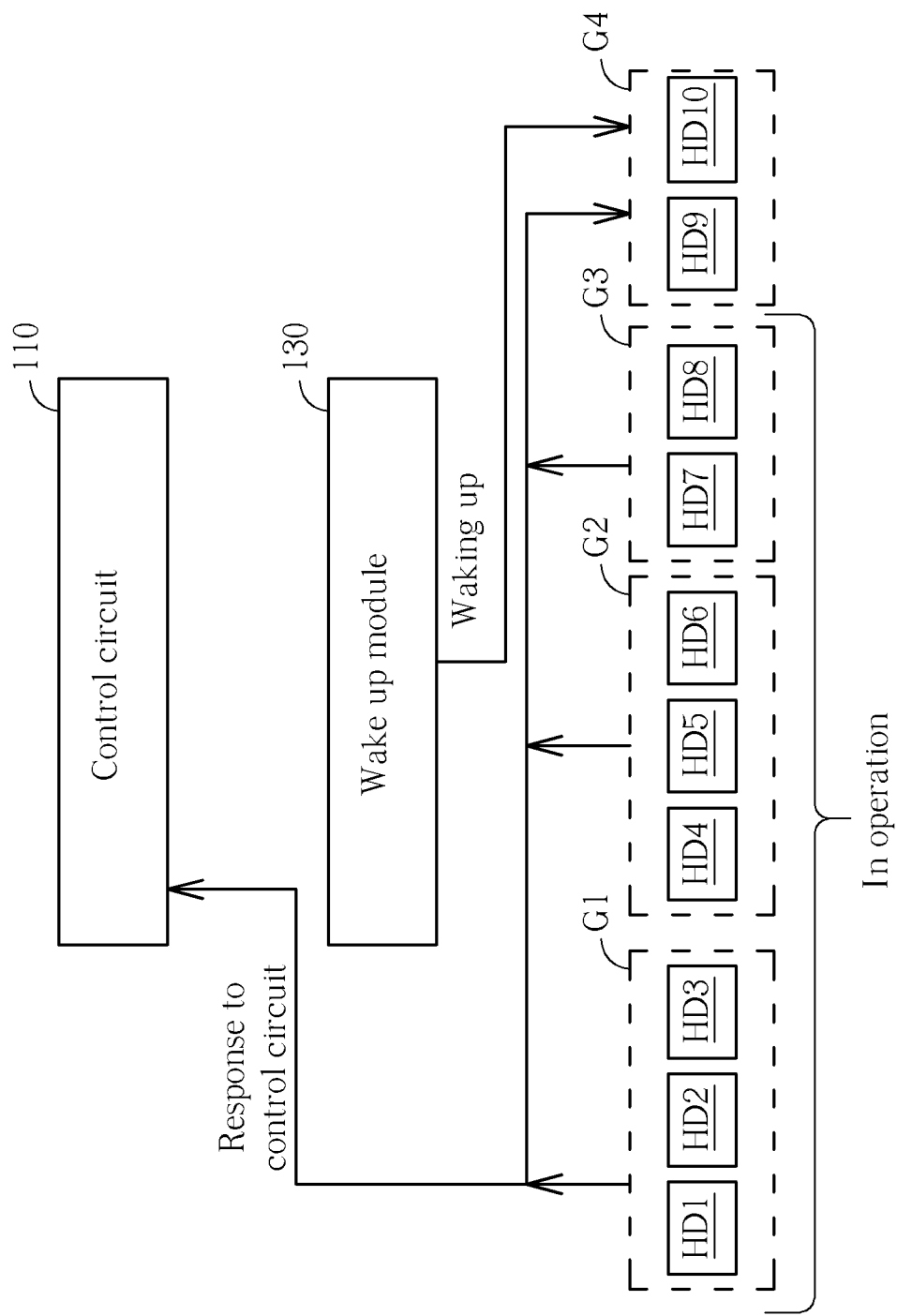

As shown in FIG. 5, after the first to the third mass storage groups G1-G3 are woken up, the wake up module 130 then wakes up the fourth mass storage group G4. The transient power to wake up the fourth mass storage group G4 is 56 Watts, which is lower than the transient power limit of the power supply 140. The total power consumption of the storage system 100 is 190 Watts, which is slightly smaller than the maximum power of the power supply 140. After all the hard disks HD1-HD10 are woken up, the total power consumption of the storage system 100 is lowered down to 160 Watts, which is lower than the maximum power of the power supply 140. And the control circuit 110 can then directly control all the hard disks HD1-HD10.

According to the above arrangement, the quantity of hard disks in each mass storage group is determined according to power consumption of the hard disks HD1-HD10 and power performance of the power supply 140. Compared to waking up all the hard disks at the same time, where the transient power limit and the maximum power of a power supply must be more than 300 Watts, the method of the present invention can utilize a power supply with smaller transient power limit and smaller maximum power.

The quantity of hard disks in each mass storage group can be predetermined according to the power consumption of the hard disks HD1-HD10 and the power performance of the power supply 140, or the quantity of hard disks in each mass storage group can be dynamically determined according to the power consumption of the hard disks HD1-HD10 and the power performance of the power supply 140 during the wake up process. When determining the quantity of hard disks in each mass storage group, the transient power to wake up the hibernated hard disks should not be over the transient power limit of the power supply 140, and the total power of the storage system 100 should not be over the maximum power of the power supply 140.

In addition, lengths of awake time intervals between each mass storage group G1-G4 can be predetermined according to the power consumption of the hard disks HD1-HD10 and the power performance of the power supply 140, or the lengths of awake time intervals between each mass storage group G1-G4 can be dynamically determined according to the power consumption of the hard disks HD1-HD10 and the power performance of the power supply 140 during the wake up process. For example, an awake time interval between the first and second mass storage groups, an awake time interval between the second and third mass storage groups, and an awake time interval between the third and fourth mass storage groups can be determined as 3 seconds, 3 seconds, and 2 seconds respectively, where the first mass storage group needs 3 seconds to be woken up, the second mass storage group needs 3 seconds to be woken up, and the third mass storage group needs 2 seconds to be woken up.

Figure 6:
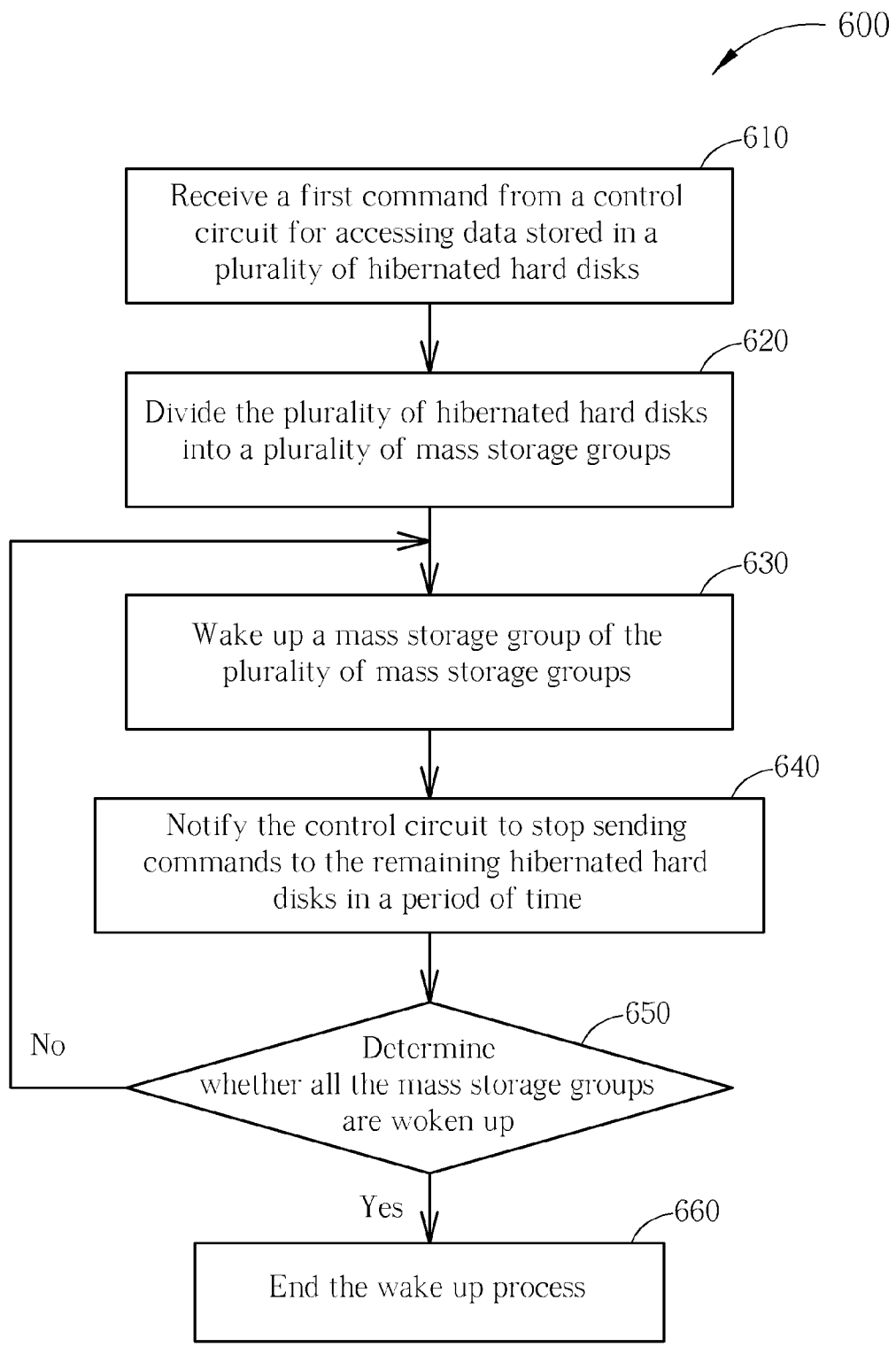
FIG. 6 is a flowchart showing a method of the present invention for waking up a plurality of hibernated mass storage devices.

Please refer to FIG. 6. FIG. 6 is a flowchart showing a method of the present invention for waking up a plurality of hibernated hard disks. The flowchart of the method for waking up a plurality of hibernated hard disks comprises the following steps:

Step 610: Receive a first command from a control circuit for accessing data stored in a plurality of hibernated hard disks;

Step 620: Divide the plurality of hibernated hard disks into a plurality of mass storage groups;

Step 630: Wake up a mass storage group of the plurality of mass storage groups;

Step 640: Notify the control circuit to stop sending commands to the remaining hibernated hard disks in a period of time;

Step 650: Determine whether all the mass storage groups are woken up; if yes, go to step 660, if not, repeat steps 630 and 640; and Step 660: End the wake up process.

Basically, to achieve the same result, the steps of the flowchart 600 need not be in the exact order shown and need not be contiguous, that is, other steps can be intermediate.

In the above embodiment, the method of the present invention is utilized to wake up a plurality of hard disks, but in other embodiments, the method of the present invention can also be utilized to wake up other kinds of mass storage devices.

In contrast to the prior art, the present invention provides a method for waking up a plurality of hibernated mass storage devices group by group in order to decrease the power consumption during the wake up process. Besides, the method of the present invention can utilize a power supply with smaller transient power limit and smaller maximum power for the storage system. Therefore, the storage system utilizing the method of the present invention is more power-efficient.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for waking up a plurality of hibernated mass storage devices, comprising:
   receiving a first command from a control circuit for accessing data stored in a plurality of hibernated mass storage devices;
   dividing the plurality of hibernated mass storage devices into a plurality of mass storage groups;
   waking up a first mass storage group of the plurality of mass storage groups;
   notifying the control circuit to stop sending commands to the remaining hibernated mass storage devices in a period of time; and
   if the control circuit transmits a second command after the first command to the remaining hibernated mass storage devices, notifying the control circuit that the remaining hibernated mass storage devices are in a busy state.

2. The method of claim 1 further comprising:
   after the first mass storage group is woken up, waking up a second mass storage group of the plurality of mass storage groups.

3. The method of claim 1, wherein the step of notifying the control circuit to stop sending commands to the remaining hibernated mass storage devices in a period of time comprises:
   notifying the control circuit that the remaining hibernated mass storage devices are in a busy state.

4. The method of claim 1 further comprising:
   determining a quantity of mass storage devices in each mass storage group according to power consumption of the mass storage devices and power performance of a power supply.

5. The method of claim 4, wherein at least one of the plurality of mass storage groups comprises two or more mass storage devices.

6. The method of claim 4, wherein determining the quantity of mass storage devices in each mass storage group according to the power consumption of the mass storage devices and the power performance of the power supply is dynamically determining the quantity of mass storage devices in each mass storage group according to the power consumption of the mass storage devices and the power performance of the power supply.

7. The method of claim 1 further comprising:
   determining lengths of awake time intervals between each mass storage group according to power consumption of the mass storage devices and power performance of a power supply.

8. The method of claim 7 wherein determining the lengths of awake time intervals between each mass storage group according to the power consumption of the mass storage devices and the power performance of the power supply is dynamically determining the lengths of awake time intervals between each mass storage group according to the power consumption of the mass storage devices and the power performance of the power supply.

9. The method of claim 1, wherein at least one of the plurality of mass storage groups comprises two or more mass storage devices.

* * * * *